US008958916B2

(12) United States Patent
Setrakian et al.

(10) Patent No.: US 8,958,916 B2
(45) Date of Patent: Feb. 17, 2015

(54) ROBOTIC ARM MODULE (71) Applicants: Mark Setrakian, Los Angeles, CA (US); Peter Abrahamson, Burbank, CA (US); Randall Adam Yates, Ventura, CA (US); Shi-Ping Hsu, Pasadena, CA (US)

(72) Inventors: Mark Setrakian, Los Angeles, CA (US); Peter Abrahamson, Burbank, CA (US); Randall Adam Yates, Ventura, CA (US); Shi-Ping Hsu, Pasadena, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 68 days.

(21) Appl. No.: 13/907,203

(22) Filed: May 31, 2013

(65) Prior Publication Data
US 2013/0325182 A1 Dec. 5, 2013

Related U.S. Application Data (60) Provisional application No. 61/653,796, filed on May 31, 2012.

(51) Int. Cl.
  *B25J 9/16* (2006.01)
  *G06F 19/00* (2011.01)
(52) U.S. Cl.
  USPC ............ 700/264; 414/6; 414/7; 414/469; 318/568.12; 901/1

(58) Field of Classification Search
  USPC ................ 700/264, 245; 414/7, 6, 469; 318/568.12, 568.11; 901/1
  See application file for complete search history.

(56) References Cited

U.S. PATENT DOCUMENTS

| | | | | |
|---|---|---|---|---|
| 3,646,976 A | * | 3/1972 | McColl | 144/242.1 |
| 3,688,821 A | * | 9/1972 | McColl et al. | 144/4.1 |
| 6,142,722 A | * | 11/2000 | Genov et al. | 414/217 |
| 6,612,797 B1 | * | 9/2003 | Bonora et al. | 414/217 |
| 2010/0092267 A1 | * | 4/2010 | Najdovski et al. | 414/7 |
| 2012/0087773 A1 | * | 4/2012 | Curotto et al. | 414/810 |
| 2012/0095619 A1 | * | 4/2012 | Pack et al. | 701/2 |
| 2012/0185091 A1 | * | 7/2012 | Field et al. | 700/254 |
| 2012/0328395 A1 | * | 12/2012 | Jacobsen et al. | 414/1 |
| 2013/0054029 A1 | * | 2/2013 | Huang et al. | 700/259 |
| 2013/0152724 A1 | * | 6/2013 | Mozeika et al. | 74/490.05 |

* cited by examiner

*Primary Examiner* — Ronnie Mancho
(74) *Attorney, Agent, or Firm* — Tarolli, Sundheim, Covell & Tummino LLP (57) ABSTRACT

A robotic arm module includes a chassis having at least one arm pod. At least one arm connected to the chassis is movable between a stowed position within the at least one arm pod and a deployed position extending from the at least one arm pod. Each arm has a gripping mechanism for gripping articles of work. An attachment structure is configured to allow a host robot to grip and manipulate the robotic arm module. An electrical interface is configured to receive electronic signals in response to a user moving remote manipulators. The electronic signals cause the at least one arm to mimic the movement of the user moving the remote manipulators.

18 Claims, 10 Drawing Sheets

FIG. 10 ic system. FIG. 1 illustrates a robotic system 20 in accordance with the present invention. The robotic system 20
ROBOTIC ARM MODULE

RELATED APPLICATIONS

This application claims the benefit of U.S. Provisional Application Ser. No. 61/653,796, filed May 31, 2012, the entirety of which is incorporated herein by reference.

TECHNICAL FIELD

The present invention relates generally to robotics, and more particularly to a robotic arm module and hierarchical robotic system.

BACKGROUND

In certain situations, military and police forces need to respond to suspicious packages or vehicles, situations in which disarming an improvised explosive device (IED) may be necessary. Tele-operated robots enable response teams to safely examine and disarm such devices, but lack the fine dexterity and responsiveness of human hands. Furthermore, current manipulators on mobile robots sacrifice precision and compactness to the necessity of moving heavy objects and withstanding debris and impacts. Current mobile robots often have robust arms with sizable grippers that can lift packages, open doors, etc. However, these manipulators may not be scaled for fine detail work such as disarming sophisticated bombs, which requires small grippers and delicate movements.

SUMMARY

The present invention is related to a robotic arm module having deployable robotic arms that contain fine manipulators and stereo cameras, positioned by a mobile robot from which the module draws power and communications. The fine manipulators allow precision and detailed operations at the work site, such as bomb disarming or examination and repair of contaminated nuclear plants. The folding configuration allows portability and protection from damage while being transported.

In accordance with an aspect of the present invention a robotic arm module includes a chassis having at least one arm pod. At least one arm is connected to the chassis and is movable between a stowed position within the at least one arm pod and a deployed position extending from the at least one arm pod. The arm has a gripping mechanism for gripping articles of work. An attachment structure is configured to allow a host robot to grip and manipulate the robotic arm module. An electrical interface is configured to receive electronic signals in response to a user moving remote manipulators. The electronic signals cause the at least one arm to mimic the movement of the user moving the remote manipulators.

In accordance with another aspect of the present invention a robotic system includes a host robot having a robotic gripping device. A robotic arm module is electrically connected to the host robot and has an arm and an attachment structure for grasping by the gripping device to secure the host robot to the arm module. The arm has a plurality of actuators for articulating the arm. Each actuator has a unique identifier for operating the actuator. An electrical interface of the arm module is configured to receive electrical signals in response to a user moving remote manipulators. The electrical signals cause the arm to mimic the movement of the user moving the remote manipulators. A tool is provided that includes at least one actuator for actuating the tool. The tool is grasped by the arm and is electrically connected to the arm module. The identifier of each arm actuator is mapped to a corresponding tool actuator upon electrical connection of the tool to the arm module such the movement of the remote manipulators actuates the tool by sending electronic signals through the arm module.

In accordance with another aspect of the present invention, a method of using a hierarchical robotic system includes providing a host robot having at least one gripping arm. Each arm includes a plurality of actuators for articulating the arm. The host robot further includes an electrical interface configured to receive electronic signals in response to a user moving remote manipulators. The electronic signals cause the at least one gripping arm to mimic the movement of the user moving the remote manipulators. A unique identifier associated with each gripping arm actuator of the host robot is mapped to a corresponding arm actuator of the arm module. The remote manipulators are moved to operate the at least one arm of the arm module by sending electronic signals through the host robot to the arm module.

The robotic arm module and the tool may be directly or indirectly mechanically connected to one another. For example, one or more secondary or tertiary robotic devices may be connected between the robotic arm module and tool to be actuated. Regardless of how many robotic devices are in the chain, however, the unique identifiers of the gripping arm are passed through all intervening devices and ultimately mapped to the tool to be actuated such that operating the manipulating arms actuates the tool.

Other objects and advantages and a fuller understanding of the invention will be had from the following detailed description of the preferred embodiments and the accompanying drawings.

DETAILED DESCRIPTION

Figure 1:
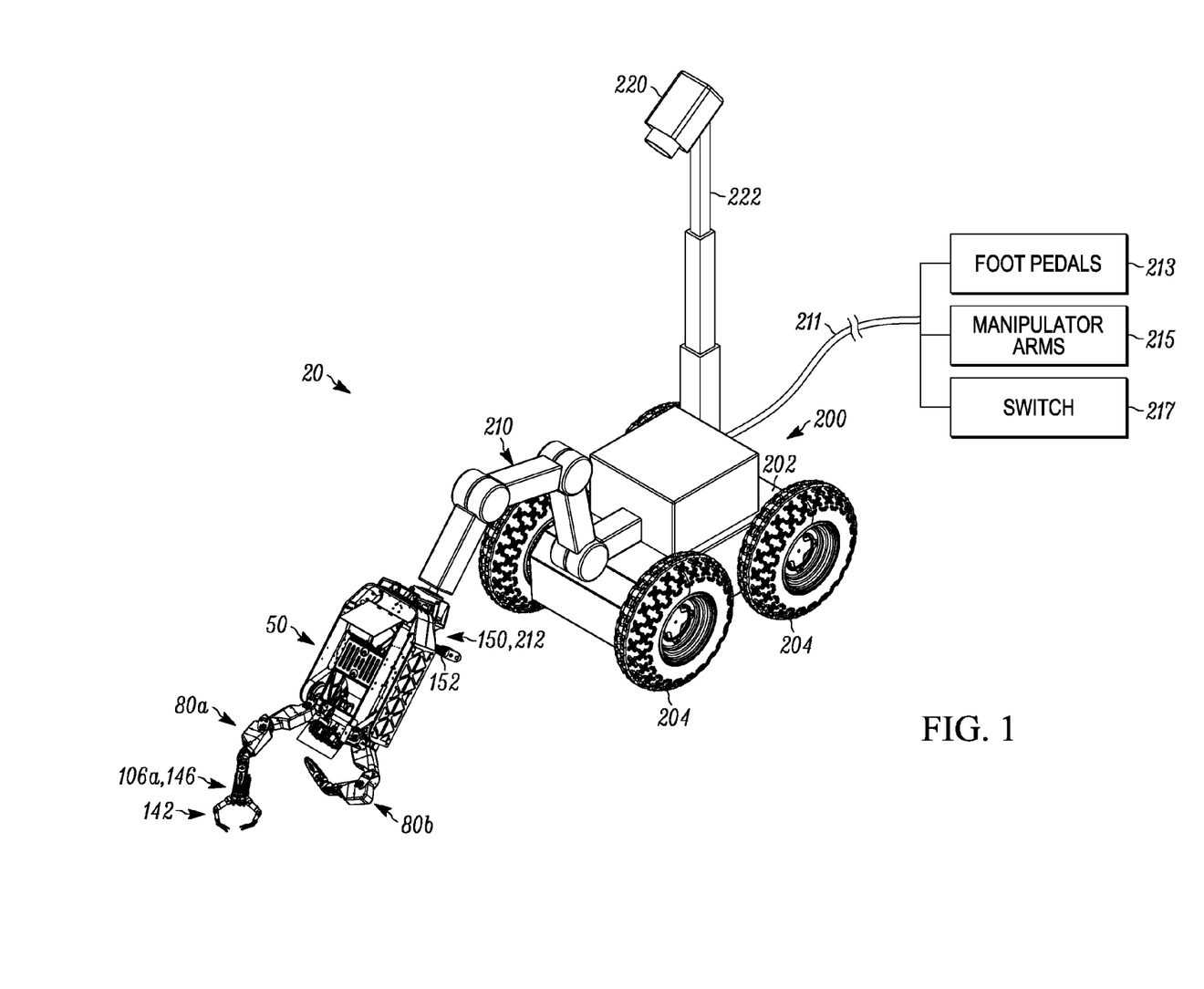
FIG. 1 is a schematic illustration of a hierarchical robotic system in accordance with the present invention.

The present invention relates generally to robotics, and more particularly to a robotic arm module and hierarchical robotic system. FIG. 1 illustrates a robotic system 20 in accordance with the present invention. The robotic system 20 includes a host robot 200, a robotic arm module 50, and a tool 142 for performing a desired task. The robotic system 20 is constructed in a hierarchical manner in which the larger host robot 200 grasps and manipulates the smaller arm module 50, which grasps and manipulates the even smaller tool 142. The tool 142 constitutes a conventional tool or another, smaller version of the robotic arm module 50 which, in turn, can grasp and manipulate a still smaller tool, etc., etc. This sequential chain of robotic devices therefore begins at the top level with the host robot 200 on a macroscale and steps down in size via one or more intervening robotic devices until reaching the bottom level microscale or nanoscale tool in the chain small enough to provide the degree of precision necessary to perform the desired task. For purposes of illustration the three-tier hierarchical structure is discussed, however, it will be appreciated that any number of intervening robotic devices or tools may be provided between the arm module 50 and the tool 142 in accordance with the present invention.

Advantageously, the end device in the entire chain—here the tool 142—can be operated by remote or telemetric devices, such as foot pedals 213 and conventional manipulating arms 215 similar to those described in U.S. Pat. Nos. 4,046,262 and 5,784,542, the entirety of which are incorporated herein by reference. In any case, operation of the tool 142 is achieved by mapping the unique identifier of each actuator used to articulate the arm module 50 through each device in the robotic chain to the tool 142. This alleviates separate electrical pathways between each device in the chain and host robot 200 and simplifies operation of all articulating components 50, 142, 200 of the robotic system 20.

Figure 2A:
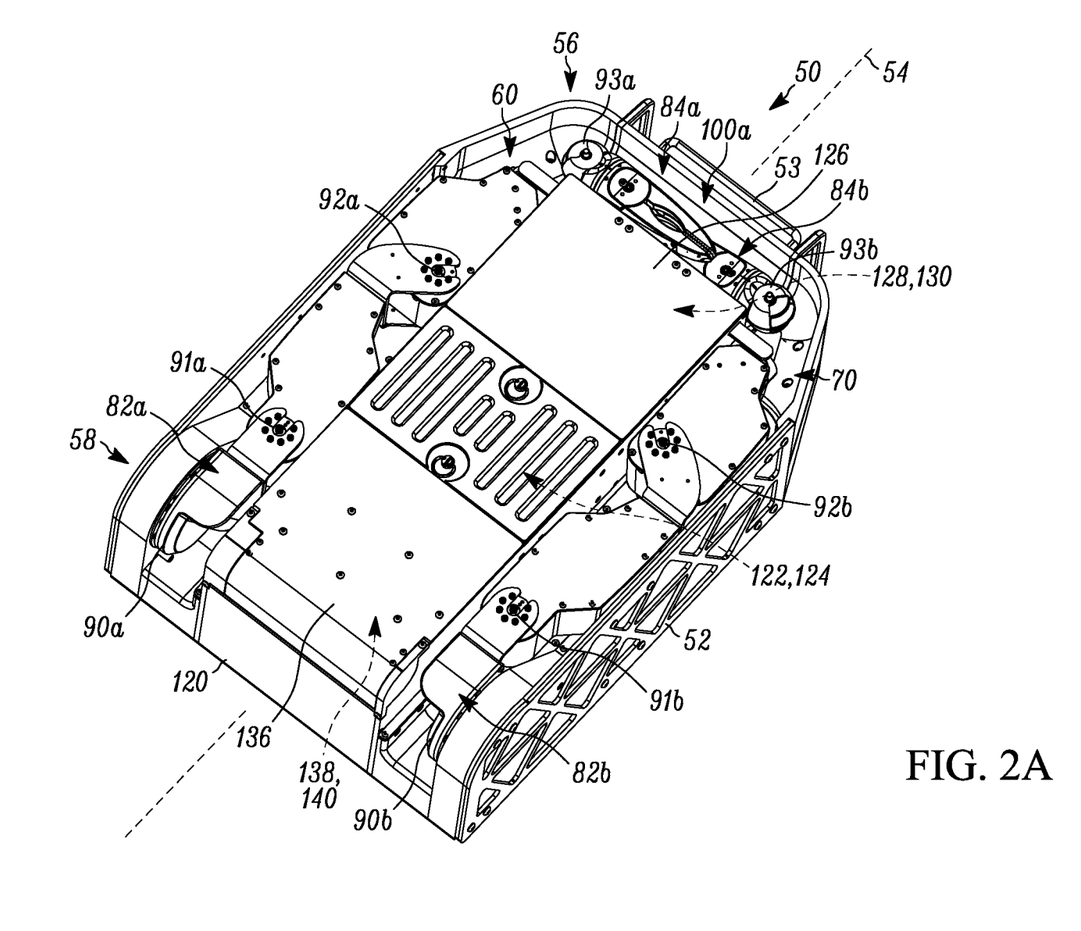
FIG. 2A is a schematic illustration of a robotic arm module of the robotic system of FIG. 1 in a stowed condition.
Figure 2B:
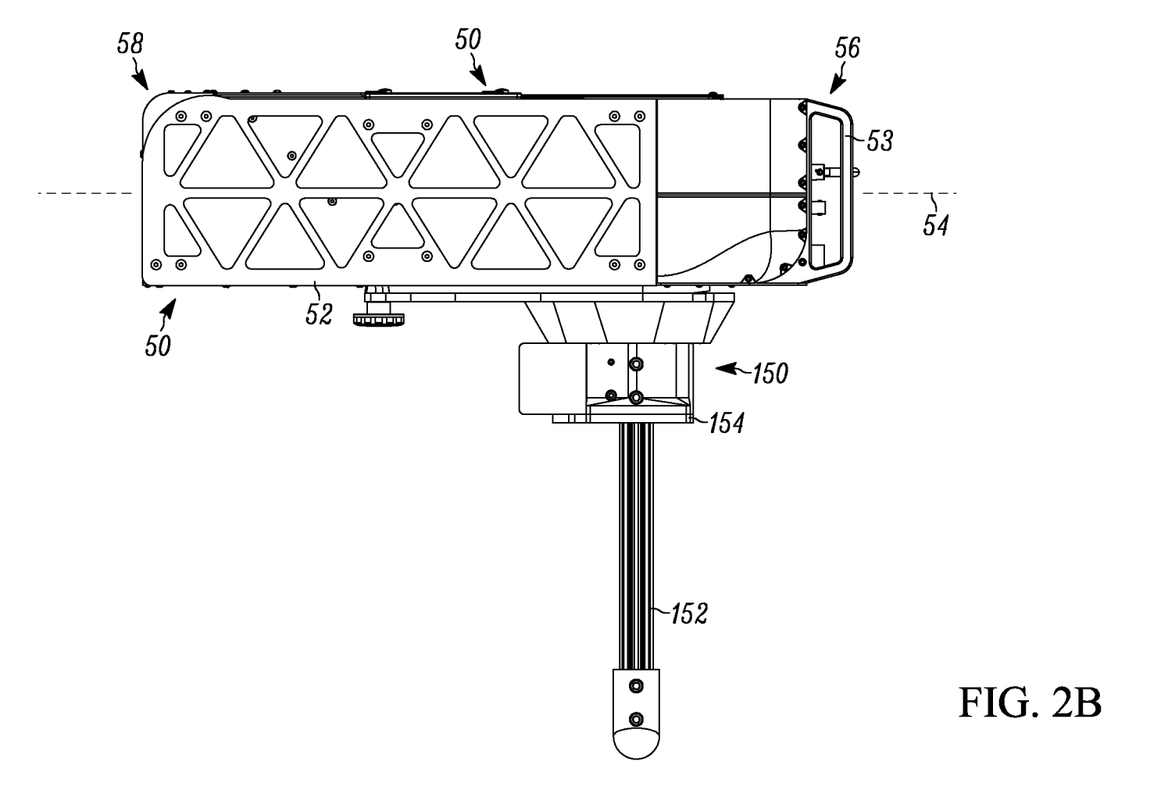
FIG. 2B is a side view of the robotic arm module of FIG. 2A.

In accordance with the present invention and referring to FIGS. 2A-2B, the robotic arm module 50 has a generally rectangular chassis 52 that extends along an axis 54 from a first end 56 to a second end 58. The chassis 52 may be formed from any durable material, such as aluminum and/or plastic. A handle 53 extends from the first end 56 and facilitates transport and handling of the arm module 50. A pair of receptacles or arm pods 60, 70 extends along the length of the chassis 52 on opposite sides of the axis 54. The arm pods 60, 70 connect to one another at the first end 56 of the chassis 52. First and second robotic arms 80a, 80b are secured to the chassis 52 and configured to be selectively stowed within each arm pod 60 and 70, respectively, as shown in FIG. 2A. Although a description of only the first arm 80a follows it will be understood that the second arm 80b includes all the same features as the first arm with the suffix "b" designating each corresponding feature in the second arm. An extensive discussion of the second arm 80b is therefore omitted for brevity.

Figure 4:
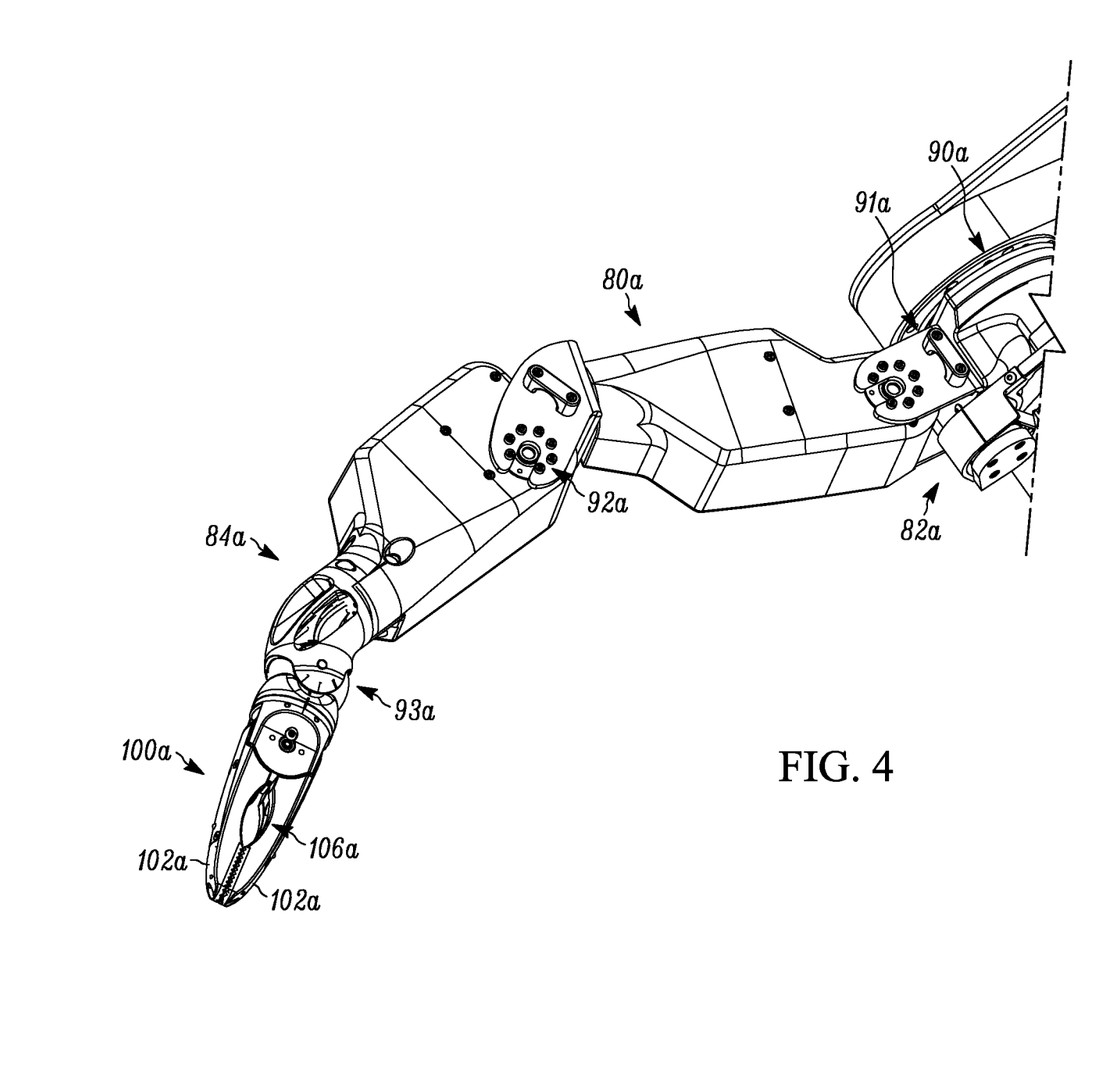
FIG. 4 is an enlarged view of an arm of the robotic arm module of FIG. 3.

As shown in FIG. 4, the first arm 80a is formed of a durable material such as aluminum and/or plastic. The first arm 80a extends from a first end 82a to a second end 84a. The first end 82a is secured to the chassis 52 at a hinged joint 90a while the second end 84a is free to pivot and/or rotate about the first end. The ends 82a, 82b are connected by a series of joints 91a-93a that allow for the first arm 80a to articulate in a way that mimics human arm movement. More specifically, the joints 91a-93a allow for the arm 80a to mimic conventional shoulder, forearm, elbow, and wrist movements. Each joint 91a-93a is connected to a separate actuator (not shown) within the chassis 52. It will be understood that each actuator could be any conventional device used to transform an input signal, e.g., electrical signal, into motion. Exemplary actuators include, but are not limited to, electrical motors, pneumatic or hydraulic actuators, hydraulic pistons, and piezoelectric actuators. In one instance, the shoulder joint 90a is driven by a servomotor within the chassis 52 through a reducing belt drive (not shown). This construction increases the available torque to be applied to the arm 80a by using the servomotor's range of motion over the more limited arc of available shoulder movement relative to the chassis 52 and arm pod 60.

The second end 84a of the first arm 80a includes a gripping mechanism 100a including one of the joints 93a corresponding to a wrist. The gripping mechanism 100a includes a pair of movable jaws 102a that selectively engage one another to form an adaptor 106a for grasping objects. The movable jaws 102a may have any known configuration suitable for grasping and releasing objects. For example, the gripping surface of each jaw 102a may be an interchangeable part that can be swapped between metal, urethane, etc. for various degrees of compliance and other properties.

Similar to the servo for the shoulder joint 90a, cable operation is used to operate the wrist joint embodied by the joint 93a, with servos in the chassis 52 driving the wrist hinge, gripping mechanism 100a rotation, and opening/closing of the jaws 102a. Cable operation allows a small gripping mechanism 100a to operate in tight spaces better than a larger hand that accommodates the servos.

Figure 3:
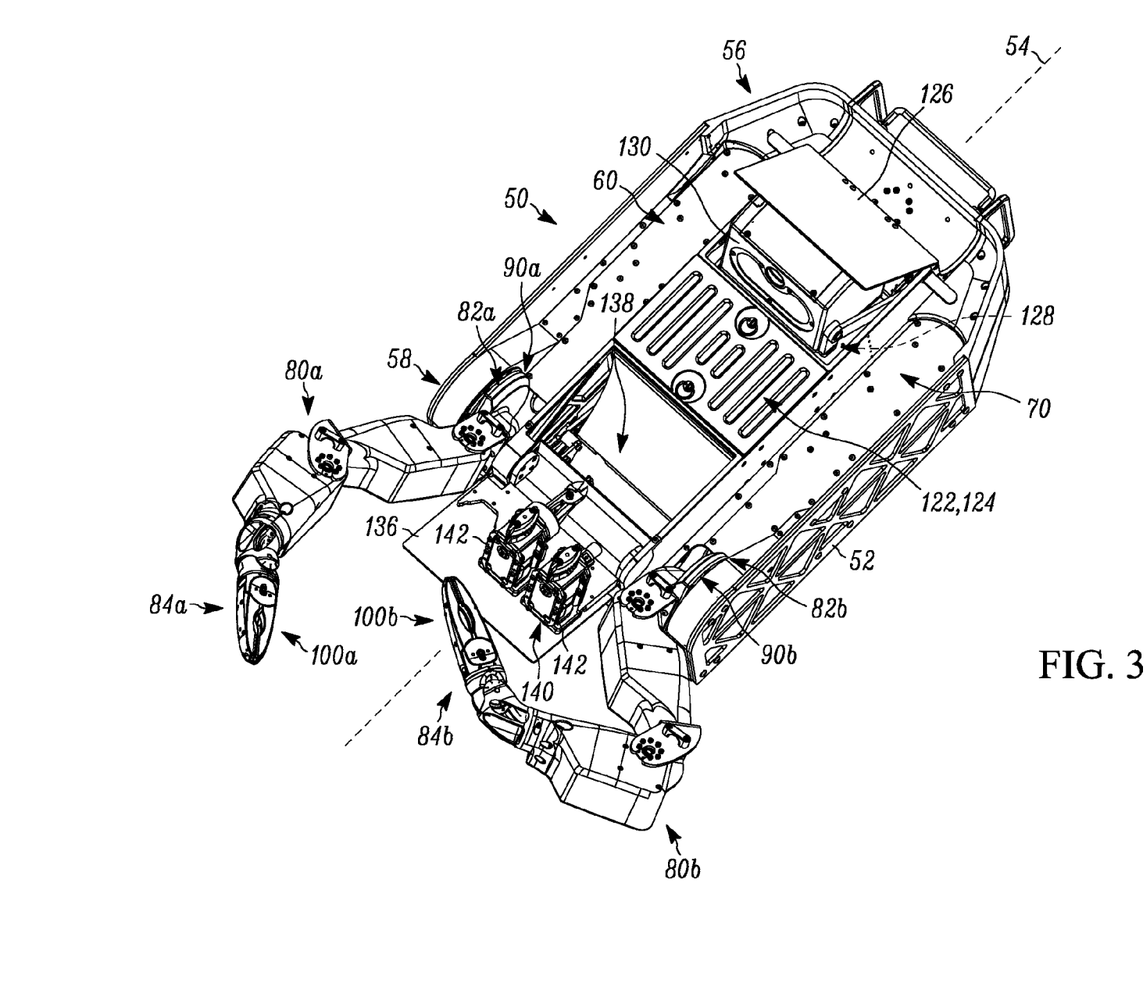
FIG. 3 is a schematic illustration of the robotic arm module of FIG. 2A in a deployed condition.

As noted, the first end 82a, 82b of each arm 80a, 80b is secured to the chassis 52 at a hinged joint 90a. Each arm 80a, 80b is therefore pivotable from an initial position (FIG. 2A) in which the arm is stowed completely in the respective arm pod 60, 70 to a deployed position (FIG. 3) in which the arms extend generally away from the chassis 52 and completely outside of the arm pods. To this end, the servo motors connected to each shoulder joint 90a, 90b can be operated to rotate or pivot each arm 80a, 80b out of its arm pod 60, 70 and into the deployed position using the aforementioned cables connected thereto. The arms 80a, 80b may be held in the stowed position during transport or storage by a fastening means, e.g., a motorized hook, located along or adjacent to each pod 60, 70.

Referring to FIG. 2B, an attachment structure 150 is secured to and extends from the chassis 52. The attachment structure 150 includes a rod 152 and a suitable shaped receiving member 154, e.g., substantially diamond or spheroid shaped. The receiving member 154 is movable along the rod 152 to a desired longitudinal position where it can be locked in place by a locking mechanism (not shown). The attachment structure 150 is configured to be grasped by the host robot 200.

A central section 120 of the chassis 52 extends generally along the axis 54 and between the arm pods 60, 70. The central section 120 includes several compartments 122, 128, 138 for storing devices associated with the arm module 50. More specifically, a battery compartment 122 located between the ends 56, 58 of the chassis 52 houses a power source 124 for supplying power to the components of the chassis. The power source 124 may constitute, for example, onboard batteries including military-standard lithium-ion Singar units. Alternatively, the battery compartment 122 may be omitted and the arm module 50 operated on external power via the power/data cables 211 (see FIG. 1).

A camera compartment 128 is located at the first end 56 of the chassis 52 and houses a camera module 130 for viewing and recording operation of the arms 80a, 80b. A door 126 closes the camera compartment 128 and covers the camera module 130 during transport and storage. The camera module 130 faces towards the second end 58 of the chassis 52 and captures the work area where the arms 80a, 80b grasp, release, and manipulate objects. The camera module 130 may be stereo, mono or high definition in construction and is capable of conventional camera operations, e.g., focusing, zooming, image and movie acquisition. A digital controller board (not shown) such as an ST microcortex M3 72 Mhz ARM is electrically connected to the camera module 130 for operation thereof.

The camera module 130 is pivotable with the door 126 from an initial, stowed position (FIG. 2A) within the camera compartment 128 to a deployed position (FIG. 3) in which the chassis 52 and—when deployed—the arms 80*a*, 80*b* can be viewed in their entirety by the camera module. The camera module 130 may be configured to be stopped at intermediate locations between the stowed and deployed positions using a servo motor (not shown). Alternatively, the camera module 130 deploys using a conventional lever method (not shown). Although the camera module 130 is illustrated as having a tilt-up construction relative to the chassis 52, it will be appreciated that the camera module may likewise have a tilt-down or telescoping configuration (not shown) in accordance with the present invention.

A tool compartment 138 is located at the second end 58 of the chassis 52 opposite the camera module 130. The tool compartment 138 is selectively closed by a door 136 to which a tool rack 140 is secured. The door 136 is pivotable about the second end 58 of the chassis 52 from an initial position (FIG. 2A) stowing and covering the tool rack 140 within the tool compartment 138 to a deployed position (FIG. 3) in which the tool rack is positioned between the arms 80*a*, 80*b* to allow the arm(s) to grasp any of the tools 142. The tool rack 140 deploys from the central section 120 of the chassis 52 using a belt drive (not shown).

Figure 5:
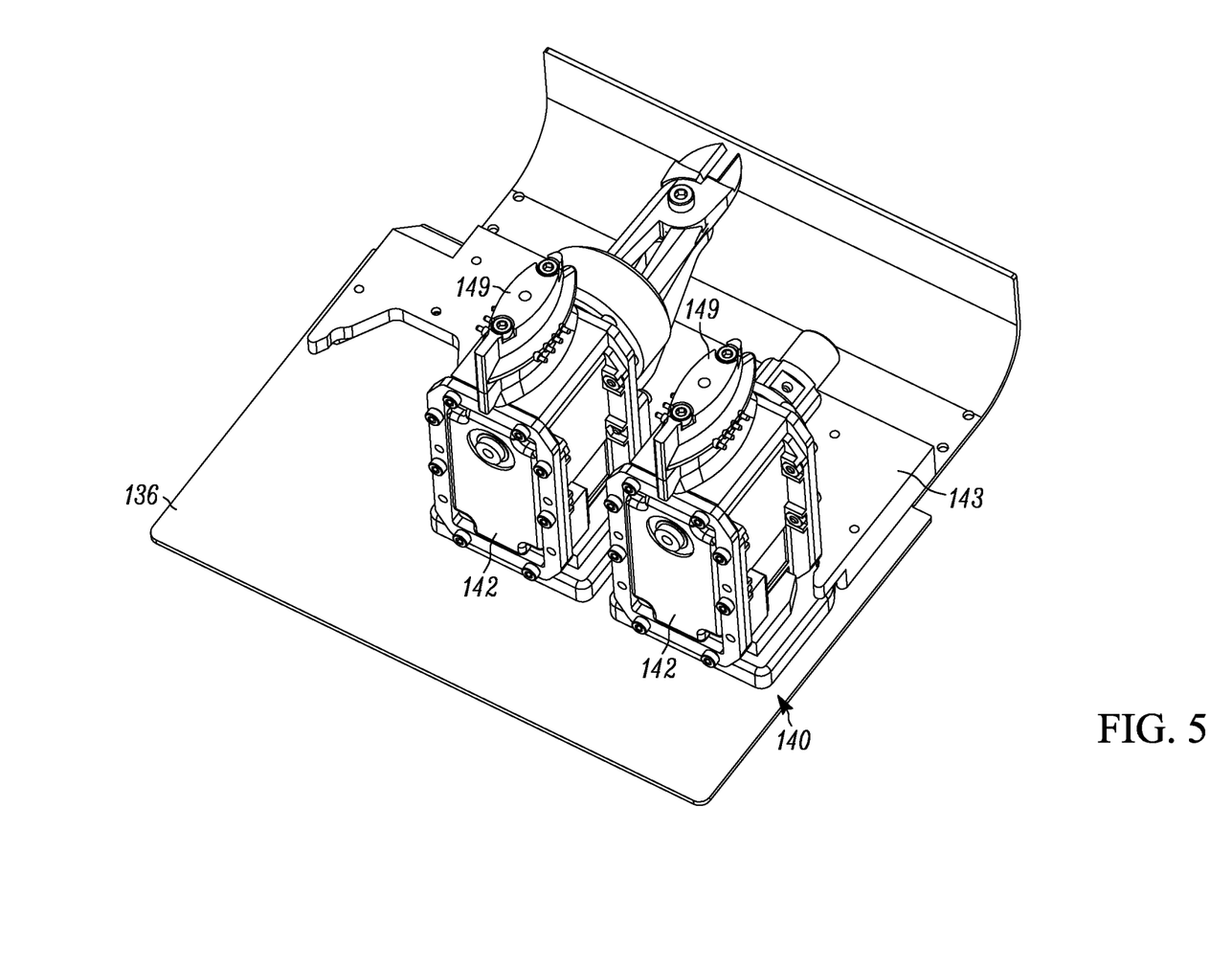
FIG. 5 is an enlarged view of a tool rack and tools associated with the robotic arm module of FIG. 3.

The tool rack 140 includes one or more tools or tool assemblies 142 for grasping by the arm(s) 80*a*, 80*b*. Referring to FIG. 5, each tool 142 may constitute any conventional tool or implement suitable for performing an automated operation, e.g., screwdriver, hammer, wire cutter, pliers, welder or medical instruments such as a syringe or forceps. Each tool 142 may alternatively constitute an actuatable tool requiring relative movement between its components or a fully articulating robot similar to the arm module 50, e.g., having arms 170*a*, 170*b* with gripping mechanisms 172*a*, 172*b* (see FIG. 8), but smaller in scale. In any case, each tool 142 includes an adaptor 149 for grasping by the jaws 102*a* of the arm 80*a*. Each tool 142 is held on the tool rack 140 via a releasable connection such as a magnetic coupling between the tool and tool rack, which prevents the tools from shifting during transport or storage. The tools 142 are further prevented from shifting in the stowed position by a plastic insert 143 secured to the door 136.

Figure 6:
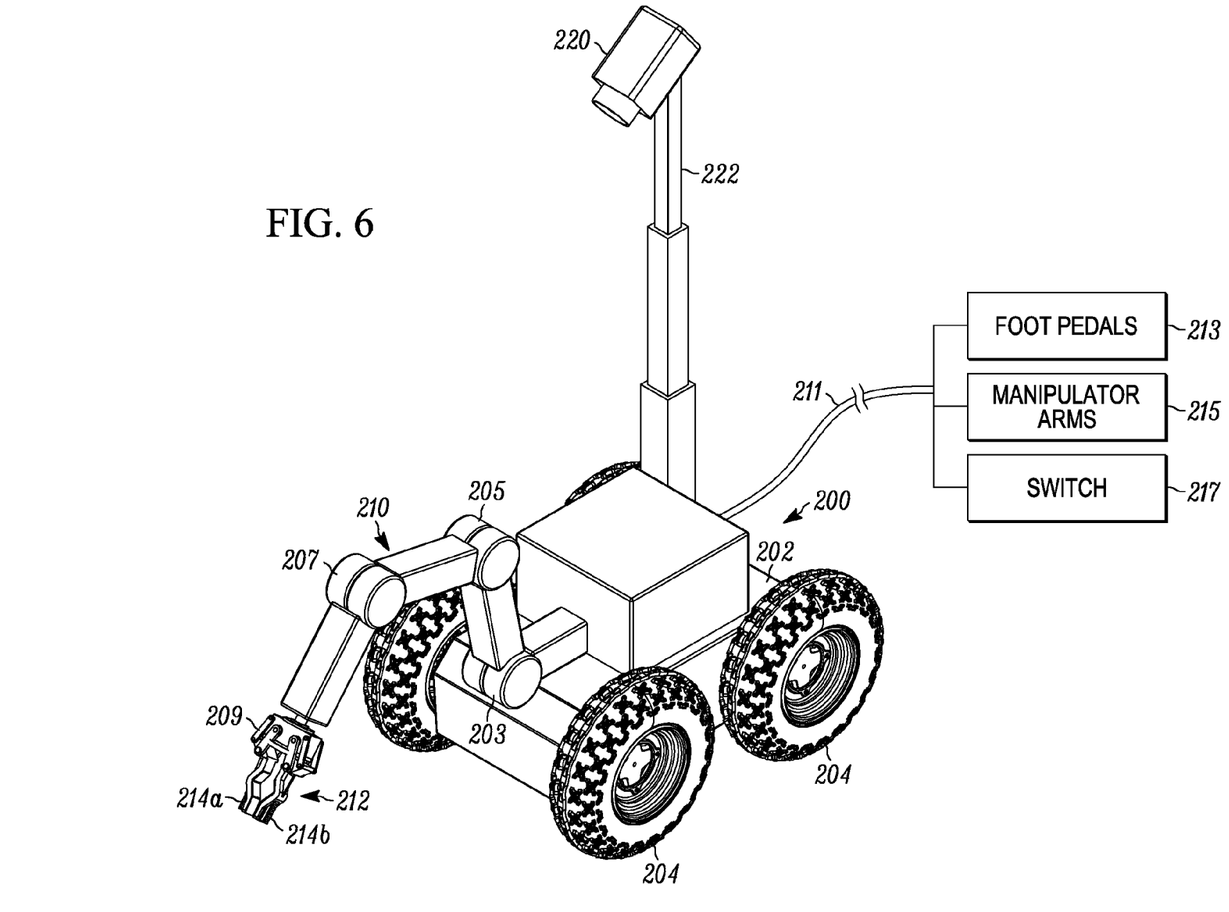
FIG. 6 is a schematic illustration of a host robot of the robotic system of FIG. 1.
Figure 7:
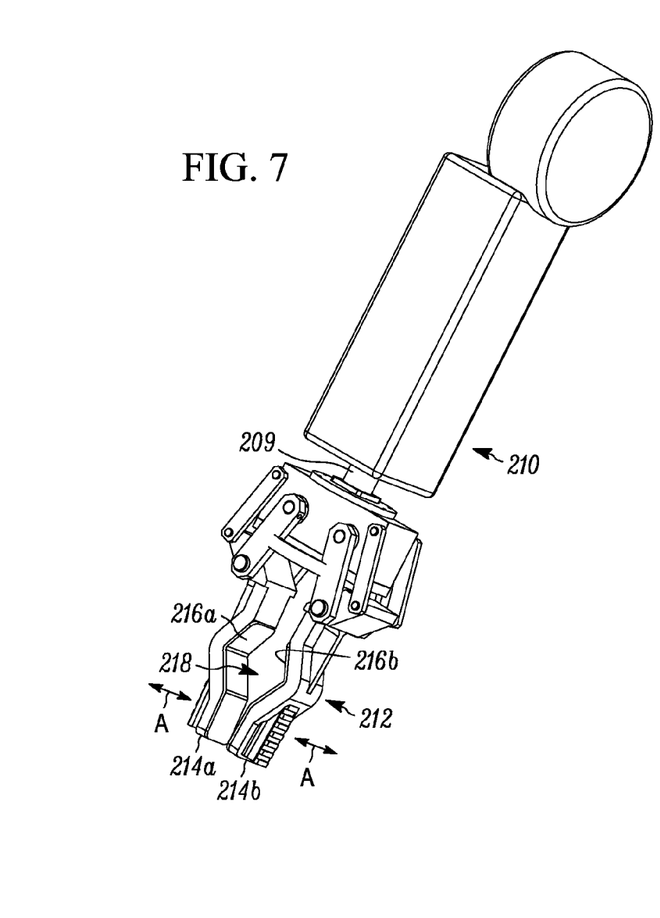
FIG. 7 is an enlarged view of a gripping device of the host robot of FIG. 6.

The host robot 200 of the present invention is illustrated in FIGS. 6-7 and is larger than the arm module 50. The host robot 200 includes a base 202 and a plurality of wheel 204 secured to the base for moving the host robot. The base 202 includes a power supply and controller (not shown) for powering and operating the host robot. A telescoping arm 222 extends from the base 202 for changing the field of view of a camera 220 secured thereto. At least one gripping arm 210 is connected to the host robot 200 and operates similar to the arms 80*a*, 80*b* of the arm module 50. In particular, each gripping arm 210 includes one end pivotally attached to the base 202 and an opposite, freely movable end. Each griping arm 210 includes a series of joints 203-209 that allow the gripping arm to articulate in any number of degrees of freedom similar to a human arm. Accordingly, a series of electrical connections, cables, and servos (not shown) extend through and are located within each gripping arm 210 and the base 202 for controlling operation and articulation of the gripping arm. Although one gripping arm 210 is shown it will be appreciated that any number of gripping arms may extend from the base 202 of the host robot 200.

As noted, one or more integrated data and power cables 211 extend from the host robot 200 and electrically connect the host robot to the foot pedals 213 and manipulation arms 215 for controlling operation of the robotic device 20. These cables 211 may constitute, for example, an RS-485 cable and may also include high-definition video feed cables connected to the camera 220 of the host robot 200. In any case, the cables 211 are electrically connected to the foot pedals 213 that a user can selectively depress to control the robotic device 20. It will be appreciated, however, that the cables 211 may be omitted and the robotic device 20 controlled wirelessly (not shown).

Referring to FIG. 7, an attachment structure constituting a gripping device 212 is secured to the free end of the gripping arm 210. The gripping device 212 includes a pair of jaws 214*a*, 214*b* that are movable towards and away from one another in the direction indicated generally by the arrows A. Each jaw 214*a*, 214*b* includes an inner surface 216*a* and 216*b*, respectively, which cooperate to define an opening 218 for receiving the receiving member 154 of the arm module 50. The inner surfaces 216*a*, 216*b* may be contoured similar to the receiving member 154, e.g., substantially diamond or spheroid shaped, such that the receiving member 154 can only be secured between the jaws 214*a*, 214*b* in a single configuration. The gripping device 212 may include an In operation, and referring to FIG. 1, the arm module 50 is placed on the ground in a manner in which the attachment structure 150 is accessible. At this time, all the components of the arm module 50, e.g., the arms 80*a*, 80*b*, the camera module 130, and the tool rack 142, are in a stowed position to prevent damage thereto (see FIG. 2A). The rod 152 of the attachment structure 150 is configured to prop the arm module 50 up at a desired angle relative to the ground. The host robot 200, using the camera 220 for guidance is brought into proximity with the arm module 50. With the jaws 214*a*, 214*b* opened, the gripping device 210 is moved into engagement with the receiving member 154 on the rod 152. The jaws 214*a*, 214*b* are then closed to mechanically connect the host robot 200 to the arm module 50.

The host robot 200 and arm module 50 may be electrically connected to one another via an interface constituting conventional electrical couplings or adaptor devices (not shown) within the receiving member 154 and the jaws 214*a*, 214*b*, e.g., electrically conductive pins and contacts, that automatically engage one another when the mechanical connection is made between the components 154, 214*a*, 214*b*. In such a case, power and data cables extend through the host robot 200 and electrically connect the cables 211 to the electrical coupling in the jaws 214*a*, 214*b* (not shown). Alternatively, the arm module 50 and host robot 200 are electrically connected together via manual connection of power and data cables between the components 50, 200. In either case, the host robot 200 may provide audio and/or visual indication, e.g., light-emitting diode (LED), that mechanical and electrical connection is properly made between the host robot and the arm module 50.

Once the electrical connection is established between the host robot 200 and arm module 50, the user can control operation of the arm module via the foot pedals 213 and/or manipulation arms 215. More specifically, the pedals 213 can be operated to move the components of the arm module 50, e.g., the arms 80*a*, 80*b*, the camera module 150, and/or the tool rack 140, between the stowed position and the deployed position. It will be understood that separate pedals 213 may be provided for each function with dividers present to prevent inadvertent operation of more than one arm module 50 component at a time. Alternatively, a single foot pedal 213 may be used for multiple functions, with a predetermined sequence of heel or toe presses being used for selecting and implementing a set of commands to stow or deploy particular arm module 50 components. The status of each pedal 213 and the current stowing/deployment command selection for the arm module 50 components may be shown on a user display (not shown).

The foot pedals 213 are operated to deploy the camera module 150 when the host robot 200, now holding the arm module 50, approaches the work site. The foot pedals 213 are also operated to deploy one or both of the arms 80a, 80b from the respective arm pod 60, 70 as well as deploy the tool rack 140 to present the tools 142 between the arms. Using the camera module 150 feed, one of the arms 80a, 80b (in this example the arm 80a) is articulated using the manipulation arms 215 to grasp a desired tool 142 from the deployed tool rack 140. Since the arms 80a, 80b are entirely visible by the camera module 130 articulation and movement of the arms can be viewed in real-time by the user.

Figure 8:
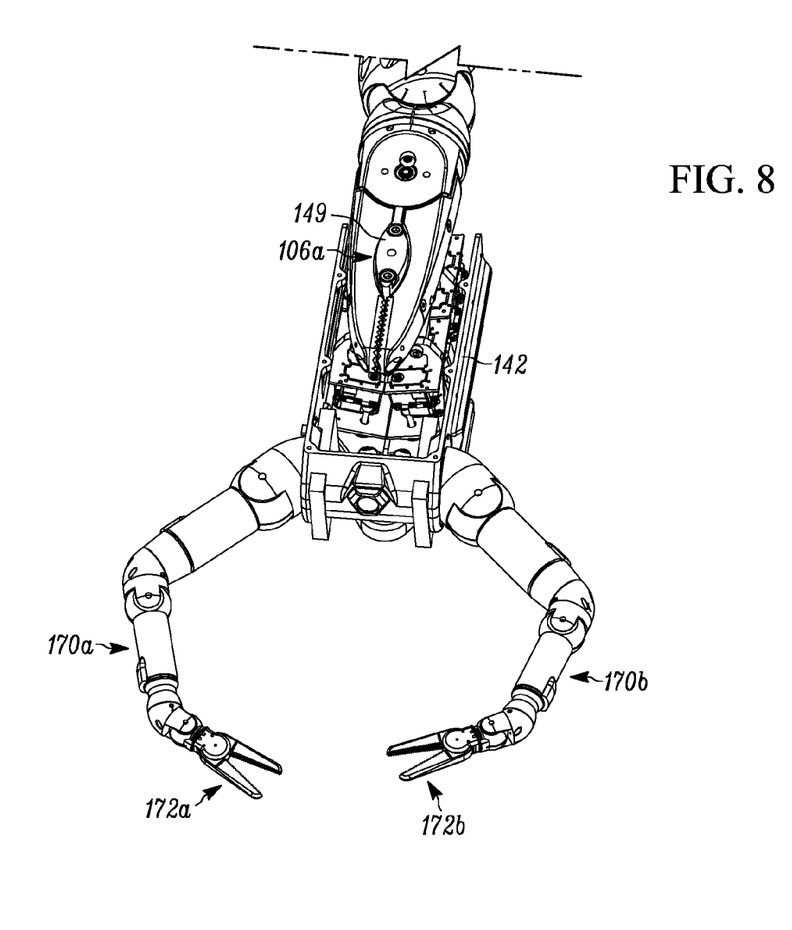
FIG. 8 is an enlarged view of a portion of FIG. 1 in which the robotic arm module grasps one of the tools from the tool rack.

Referring to FIG. 8, to facilitate grasping of the tool 142 and to automatically electrically connect the arm module 50 to the tool 142, the adaptors 106a of the arm module 50 and the adaptor 149 of each tool 142 may be configured similar to the construction of the jaws and tool adaptor described in co-pending U.S. application Ser. No. 13/900,654, filed May 23, 2013, the entirety of which is incorporated herein by reference. The jaws 102a of the present invention may therefore cooperate to form a biconvex or substantially spheroid adaptor 106a for grasping a similarly shaped adaptor 149 on the tool 142. Consequently, the substantially similar adaptors 106a, 149 self-align with the one another when the jaws 102a engage and close around the tool 142 adaptor to ensure a reliable mechanical connection between the jaws and tool.

Likewise, the electrical couplings (not shown) of the adaptors 106a, 149 may automatically engage one another when the secure mechanical connection is established between the jaws 102a and tool 142 to thereby electrically link the jaws and tool together. Regardless, the arm module 50 may provide audio and/or visual indication, e.g., LED, that mechanical and electrical connection is properly made between the jaws 102a and the tool 142 selected. Force and/or position sensors (not shown) within the adaptors 106a, 149 may further help ensure a proper connection between the jaws 102a and the tool 142. Once the tool 142 is chosen the tool rack 140 is stowed until the task requiring the tool is complete.

Referring back to FIG. 1, since the host robot 200, arm module 50, and tool 142 are now mechanically connected to one another, operating the pedals 213 and/or manipulator arms 215 operates and manipulates the tool 142 in the manner desired. The camera module 150 can be used to monitor articulation and use of the tool 142 while the desired task is performed by the user using the devices 213, 215. If at any time before or during operation of the robotic system 20 it is necessary for the host robot 200 to release the arm module 50, i.e., by releasing the jaws 214a, 214b from the receiving member 154, the rod 152 of the attachment structure 150 acts to prop the arm module up relative to the ground in a desired configuration to, for example, inspect a suspicious package. The host robot 200 can therefore drop or release the arm module 50 in a desired position and flee the work site when necessary. The host robot can continue electrical and data communication with the released arm module 50 wirelessly or via physical cables connecting the host robot to the arm module.

Although only arm module 50 grasped by a single grasping arm 210 of the host robot 200 is illustrated, it will be appreciated that where multiple grasping arms 210 are present multiple arm modules 50 may likewise be present. Accordingly, each grasping arm 210 may grasp a separate arm module 50, which may grasp one more tools 142 or robotic devices in series and/or in parallel. One having ordinary skill in the art will therefore recognize that any number of robotic devices may be mechanically and electrically connected with one another in a hierarchical structure having any conceivable combination involving serial and/or parallel connections between robotic device.

Figure 9:
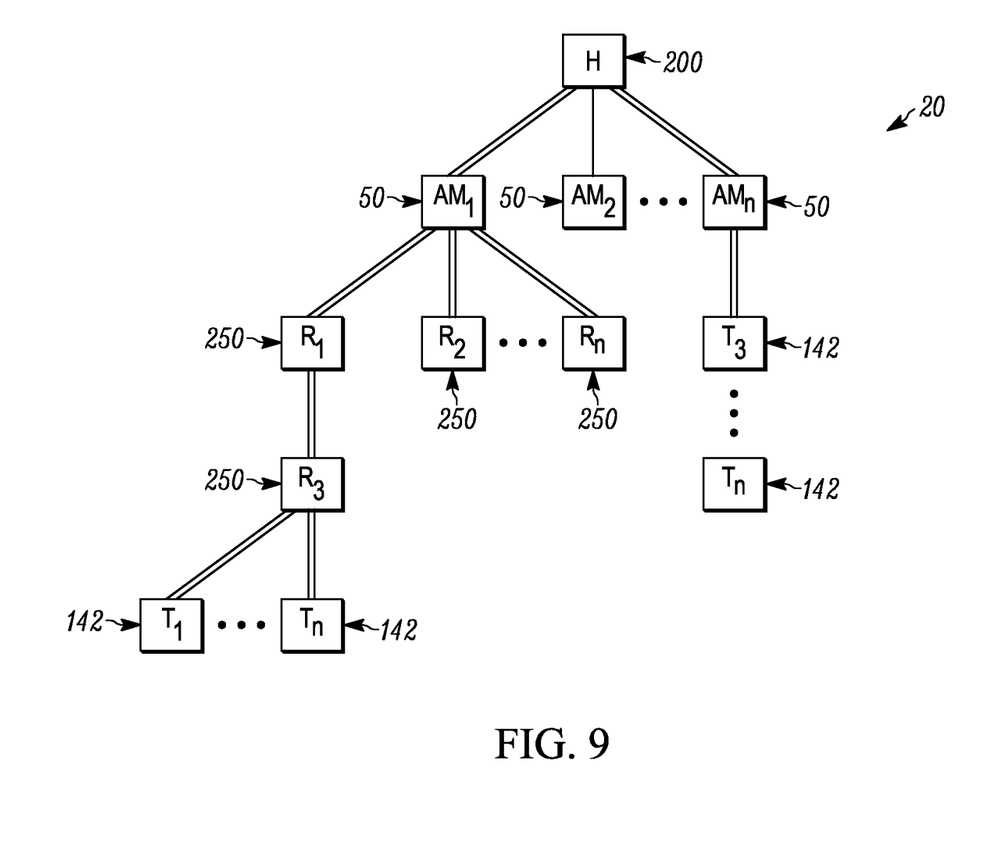
FIG. 9 is a flow chart depicting serial and parallel configurations for the robotic system of the present invention.

Similarly, although the present invention has been described and illustrated as using a serial or lineal hierarchical structure, it will be appreciated that a parallel or binary configuration may be used in addition to or in lieu of the illustrated construction. For example, both arms 80a, 80b of the arm module 50 may grasp a selected tool to which the gripping arm actuator identifiers are mapped. There may be no intervening robotic devices between the arm 80a, 80b and the respective grasped tool or there may be at least one intervening robotic device connected in series with the arm 80a and/or the arm 80b in accordance with the present invention. The general hierarchical concept is depicted in FIG. 9 in a tree-like structure in which a host robot H is mechanically and electrically connected to at least one arm module $AM_1$ and up to $AM_n$ arm modules in a parallel relationship, where n is any positive integer. At least robotic device $R_1$ and up to $R_n$ robotic devices can be connected in series and/or in parallel to the arm modules AM or other robotic devices R. Similarly, at least tool $T_1$ and up to $T_n$ tools can be connected in series and/or in parallel to the arm modules AM and/or to the robotic devices R.

The present invention is particularly advantageous wherein the tool 142 at the end of the robotic chain is actuatable or robotic. Since the tool 142 is now electrically connected to the arm module 50, which is electrically connected to the host robot 200, the tool becomes electrically connected to the host robot. Therefore, the tool 142 is electrically connected to the pedals 213 and manipulator arms 215 via the power and data cables 211. Advantageously, the robotic system 20 of the present invention is configured to facilitate operation of any tool 142 having articulating or robotic capability by alleviating the need for separate power and data communication lines between the host robot 200 and the arm module 50 as well as between the host robot and the tool 142. In particular, a process of actuator identifier mapping is used. Each actuator within the arm module 50 associated with a joint 91a-93a in the arm 80a [and corresponding joints 91b-93b in the arm 80b] as well as the gripping mechanism 100a is given a unique identifier, e.g., reference code, address or other distinguishing marker. In other words, electrical data signals or commands sent by the control pedals 213 or manipulator arms 215 and given a particular identifier are received only by the specific actuator in the arm module 50 bearing the identifier to articulate or manipulate the corresponding joint 91a-93a or gripping mechanism 100a.

When electrical communication is established between the arm module 50 and the tool 142, the unique identifier of an actuator in the arm 80a is mapped or copied to a corresponding actuator in the tool 142 until every tool actuator has an arm actuator identifier. In other words, each unique identifier now corresponds to an actuator in the arm 80a and a corresponding actuator in the tool 142. A switch 217 is provided that selectively turns the identifier mapping on and off to enable the user to switch between a first condition in which the gripping arm 80a moves the unactuated tool 142 in response to user movement of the manipulator arms 215 and a second condition in which the tool is actuated while the gripping arm is held in a fixed position. The first condition allows the user to move the unactuated tool 142 into position at the work site. In this condition, the unique identifiers of the arm 80*a* are not mapped to the actuators of the tool 142 and, thus, movements by the manipulator arms 217 are sent to the arm and not the tool. The second condition allows the user to fix the tool 142 in the desired position while the tool is actuated and operated to perform the desired task. In this condition, the unique identifiers of the arm 80*a* are mapped to the actuators of the tool 142 and, thus, movements by the manipulator arms 217 are sent to the tool while the arm merely acts as a pass-through for commands from the manipulator arms. Accordingly, the present invention allows the user to both move the tool 142 into the desired position with precision, lock the tool in place by locking the arm 80*a* in a fixed position, and actuate the tool to perform the desired task.

Due to the construction of the present invention, the robotic system 20 allows this actuator identifier mapping to be repeated for each successive robotic or actuatable tool connected in series and/or in parallel between the arm module 50 and the last tool(s) 142 in the chain which performs the desired task(s). As the chain becomes longer, each successive device becomes smaller to provide greater precision to movement and allow more delicate and complicated tasks to be performed. The robotic system 20 of the present invention therefore acts in a hierarchical manner by mapping the unique identifier of each actuator in the arm module 50 to corresponding actuators in each subsequently connected robotic device or tool in series or parallel in the chain until the arm 80*a* identifiers ultimately correspond with actuators in the tool(s) 142 to be actuated.

It will be understood that the identifier mapping discussed can likewise be used in a two-robot construction that includes only the host robot 200 and the arm module 50. In this case, the actuator associated with each joint 203-209 in the gripping arm 210 has a unique identifier. When the arm module 50 is grasped by the gripping device 210 the unique identifier of each gripping actuator is mapped to a corresponding actuator in the arm(s) 80*a*, 80*b* of the arm module. Therefore, commands sent by the pedals 213 and manipulating arms 215 are passed through the host robot 200 and into the arm module 50 where they are used to operate the arm(s) 80*a*, 80*b*. Accordingly, the switch 217 in this construction has a first condition in which the gripping arm 210 moves the stationary, unactuated arm(s) 80*a*, 80*b* of the arm module 50 in response to user movement of the manipulator arms 215 and a second condition in which the arm(s) 80*a*, 80*b* are actuated and articulatable while the gripping arm 210 is held in a fixed position.

Figure 10:
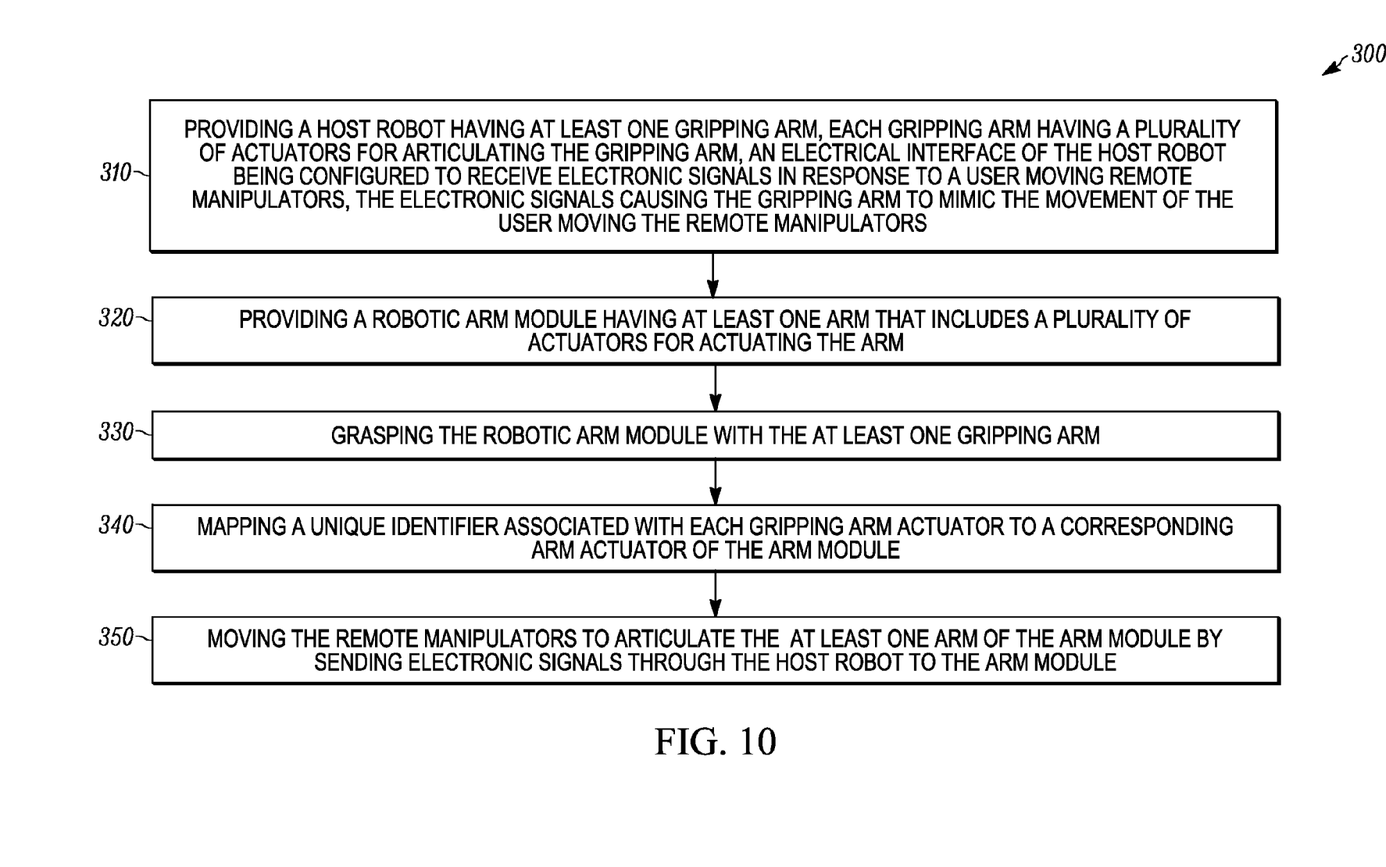
FIG. 10 is a flow chart depicting a method of using the hierarchical robotic system in accordance with another aspect of the present invention.

A method 300 of using a hierarchical robotic system 20 in accordance with an aspect of the present invention is illustrated in FIG. 10. At step 310, a host robot 200 is provided having at least one gripping arm 210, each gripping arm having a plurality of actuators for articulating the gripping arm. An electrical interface of the host robot 200 is configured to receive electronic signals in response to a user moving remote manipulators. The electronic signals cause the gripping arm 210 to mimic the movement of the user moving the remote manipulators. At step 320, a robotic arm module 50 having at least one arm 80*a*, 80*b* that includes a plurality of actuators for articulating is provided. At step 330, the robotic arm module 50 is grasped by the at least one gripping arm 210. At step 340, a unique identifier associated with each gripping arm actuator of the host robot 200 is mapped to a corresponding arm actuator of the arm module 50. At step 350, the remote manipulators are moved to articulate the at least one arm 80*a*, 80*b* of the arm module 50 by sending electronic signals through the host robot 200 to the arm module.

It will be understood from the specification that the robotic arm module 50 and the tool 142 need not be directly mechanically connected to one another. In other words, one or more secondary or tertiary robotic tool devices or robotic devices may be connected between the robotic arm module 50 and tool 142 to be actuated. Regardless of how many robotic devices are in the chain, however, the unique identifiers of the gripping arm 80*a* are passed through all intervening devices and ultimately mapped to the tool 142 to be actuated such that operating the manipulating arms 215 actuates the tool 142.

Although the robotic system 20 of the present invention is described as transferring power and data sequentially through the components 213, 215, 200, 50, 142 it will be understood that wireless technology may be implemented to bypass any or all electrical connections between adjoining components. For instance, the food pedals 213 and/or arm manipulators 215 may be wirelessly connected to the arm module 50 such that the host robot 200 is bypassed completely while still allowing the food pedals and/or arm manipulators to operate the arm module and arms 80*a*, 80*b* thereof.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. A robotic arm module comprising:
    a chassis having at least one arm pod;
    at least one arm connected to the chassis and movable between a stowed position within the at least one arm pod and a deployed position extending from the at least one arm pod, the arm having a gripping mechanism for gripping articles of work;
    an attachment structure configured to allow a host robot to grip and manipulate the robotic arm module; and
    an electrical interface configured to receive electronic signals in response to a user moving remote manipulators, the electronic signals causing the at least one arm to mimic the movement of the user moving the remote manipulators.

2. The robotic arm module of claim 1, wherein the chassis is rectangular and each arm pod extends along the length of the chassis on opposite sides of a longitudinal axis of the chassis.

3. The robotic arm module of claim 1, further comprising a tool rack having a plurality of tools and being movable between a stowed position within the chassis to a deployed condition in which the tools are accessible to the at least one arm.

4. The robotic arm module of claim 3, wherein each tool has a magnetic interface with the tool rack for holding the tools in place during stowing and deployment of the tool rack.

5. The robotic arm module of claim 3, wherein each tool has a spheroid adaptor that mates with a spheroid adaptor of the gripping mechanism of the at least one arm.

6. The robotic arm module of claim 3, wherein grasping one of the tools with the at least one arm electrically connects the at least one arm to the grasped tool.

7. The robotic arm module of claim 3, wherein each arm includes a plurality of actuators for articulating the arm which each have a unique identifier, each tool including at least one actuator for operating the tool, the identifier of each arm actuator being mapped to a corresponding tool actuator upon electrical connection of the tool to the arm module such movement of the remote manipulators actuates the tool by sending electronic signals through the arm module.

8. The robotic arm module of claim 7, further comprising a switch having a first condition in which the arm moves the unactuated tool in response to user movement of the remote manipulators and a second condition in which the tool is actuated while the arm is held in a fixed position.

9. The robotic arm module of claim 1, further comprising a camera module movable between a stowed position within the chassis to a deployed position in which the at least one arm is visible by the camera module.

10. A robotic system comprising:
a host robot having a robotic gripping device;
a robotic arm module electrically connected to the host robot and having an arm and an attachment structure for grasping by the gripping device to secure the host robot to the arm module, the arm having a plurality of actuators for articulating the arm, each actuator having a unique identifier for operating the actuator, an electrical interface of the arm module being configured to receive electrical signals in response to a user moving remote manipulators, the electrical signals causing the arm to mimic the movement of the user moving the remote manipulators; and
a tool having at least one actuator for actuating the tool, the tool being grasped by the arm and being electrically connected to the arm module, the identifier of each arm actuator being mapped to a corresponding tool actuator upon electrical connection of the tool to the arm module such movement of the remote manipulators actuates the tool by sending electronic signals through the arm module.

11. The robotic system of claim 10, wherein the tool has a spheroid adaptor that mates with a spheroid adaptor of the arm.

12. The robotic system of claim 10, further comprising a switch having a first condition in which the arm moves the unactuated tool in response to user movement of the remote manipulators and a second condition in which the tool is actuated while the arm is held in a fixed position.

13. The robotic system of claim 10, wherein the arm module further includes a chassis to which the arm is attached and a camera module movable between a stowed position within the chassis to a deployed position in which the arm is visible by the camera module.

14. A method of operating a robotic system comprising:
providing a host robot having at least one gripping arm, each gripping arm having a plurality of actuators for articulating the gripping arm, an electrical interface of the host robot being configured to receive electronic signals in response to a user moving remote manipulators, the electronic signals causing the gripping arm to mimic the movement of the user moving the remote manipulators;
providing a robotic arm module having at least one arm that includes a plurality of actuators for articulating the arm;
grasping the robotic arm module with the at least one gripping arm;
mapping a unique identifier associated with each gripping arm actuator of the host robot to a corresponding arm actuator of the arm module; and
moving the remote manipulators to articulate the at least one arm of the arm module by sending electronic signals through the host robot to the arm module.

15. The method of claim 14, further comprising switching between a first condition in which the at least one gripping arm moves each arm of the arm module in an unactuated state in response to user movement of the remote manipulators and a second condition in which each arm of the arm module is actuated while the gripping arm of the host robot is held in a fixed position.

16. The method of claim 14, further comprising:
providing a tool having at least one actuator for operating the tool;
grasping the tool with the at least one arm of the arm module to electrically connect the arm module to the tool;
mapping the unique identifier associated with each gripping arm of the host robot to a corresponding tool actuator; and
moving the remote manipulators to articulate the tool by sending electronic signals through the host robot and the arm module.

17. The method of claim 16, further comprising electrically and mechanically connecting at least one robotic device between the arm module and the tool.

18. The method of claim 14, further comprising:
electrically and mechanically connecting at least one robotic device to the at least one arm of the arm module to from a chain of interconnected robotic devices extending from the at least one gripping arm of the host robot; and
mapping the unique identifier associated with each gripping arm actuator of the host robot to a corresponding actuator in a last robotic device of the chain of interconnected robotic devices such that moving the remote manipulators articulates the last robotic device by sending electronic signals through the host robot and the chain of interconnected robotic devices.

* * * * *